United States Patent
Tai et al.

(10) Patent No.: US 11,655,955 B1
(45) Date of Patent: May 23, 2023

(54) VEHICLE LAMP STRUCTURE

(71) Applicant: MIN HSIANG CORPORATION, Tainan (TW)

(72) Inventors: Shang-Kuei Tai, Tainan (TW); Ying-Fang Tseng, Tainan (TW); Tung-Sheng Hsieh, Tainan (TW); Chih-Wei Shih, Tainan (TW)

(73) Assignee: Min Hsiang Corporation, Tainan (TW)

( * ) Notice: Subject to any disclaimer, the term of this patent is extended or adjusted under 35 U.S.C. 154(b) by 0 days.

(21) Appl. No.: 17/817,790

(22) Filed: Aug. 5, 2022

(51) Int. Cl.
| | | |
|---|---|---|
| *F21S 43/14* | (2018.01) | |
| *F21S 43/50* | (2018.01) | |
| *F21S 43/20* | (2018.01) | |
| *F21S 43/19* | (2018.01) | |
| *F21Y 115/10* | (2016.01) | |

(52) U.S. Cl.
CPC ............. *F21S 43/14* (2018.01); *F21S 43/195* (2018.01); *F21S 43/20* (2018.01); *F21S 43/51* (2018.01); *F21Y 2115/10* (2016.08)

(58) Field of Classification Search
CPC .. F21S 43/14; F21S 43/20; F21S 43/51; F21S 43/195
USPC ........................................................ 362/509
See application file for complete search history.

(56) References Cited

U.S. PATENT DOCUMENTS

| | | | |
|---|---|---|---|
| 6,183,100 B1* | 2/2001 | Suckow | G09F 9/33 340/471 |
| 6,414,801 B1* | 7/2002 | Roller | B60Q 1/0052 362/240 |
| 7,207,697 B2* | 4/2007 | Shoji | F21V 5/045 362/322 |
| 7,525,127 B2* | 4/2009 | Hattori | H01S 5/02315 257/E33.059 |
| 8,998,467 B2* | 4/2015 | Dubose | F21S 43/145 362/511 |
| 9,062,845 B1* | 6/2015 | Tsai | B60Q 1/0052 |
| 2002/0136013 A1* | 9/2002 | Crunk | F21V 19/005 362/310 |
| 2003/0165065 A1* | 9/2003 | Roller | F21S 43/14 362/547 |
| 2013/0141932 A1* | 6/2013 | Brown | F21S 43/315 362/520 |
| 2022/0333758 A1* | 10/2022 | Ko | F21V 19/004 |

* cited by examiner

*Primary Examiner* — Bryon T Gyllstrom
(74) *Attorney, Agent, or Firm* — Rosenberg, Klein & Lee

(57) ABSTRACT

The present invention provides a vehicle lamp structure, which includes a base, a circuit board, at least one first light-emitting element, a ring block, a first optical element and an optical cover. The circuit board is disposed above the base. The first light-emitting element is disposed on a top surface of the circuit board. The ring block is disposed above the circuit board. The first optical element is disposed above the first light-emitting element. The optical cover hoods the first optical element. Wherein, the ring block surrounds the first light-emitting element, and the first optical element and the optical cover are spaced by a distance.

18 Claims, 6 Drawing Sheets

VEHICLE LAMP STRUCTURE

FIELD OF THE INVENTION

The present invention relates generally to a vehicle lamp structure, and particularly to a vehicle lamp structure with enhanced light-emitting efficiency.

BACKGROUND OF THE INVENTION

Taillights are a lamp set at the rear of a vehicle and include turn-signal lamps, brake lamps, location lamps, fog lamps, reversing lamps, and parking lamps. Generally, taillights are used to notify the vehicles behind of the moving status of the vehicle, including turning or braking, for preventing accidents. Besides, the current trend of light sources is light-emitting diode (LED) lamps.

An LED lamp is a lamp using LED. An LED emits light by recombination of electrons and holes inside. Compared to halogen lamps, LED lamps own the advantages of longer lifetime, small size, high light-emitting efficiency, and low costs. They are driven by direct-current (DC) voltages and generally applied to household bulbs, traffic lights, vehicle headlights, turn-signal lights, and taillights.

Please refer to the Taiwan patent number 248,764, which discloses an improved brake lamp structure. The brake lamp structure uses a ring to contact the three-dimensional (3D) round surface of the external lens. Unfortunately, once the external lens is shifted, it is difficult for the 3D round surface to contact the ring tightly and hence leading to the light leakage problem.

Accordingly, the present invention provides a vehicle lamp structure for solving the light leakage problem in the prior art. Furthermore, the present invention can improve the fragment problem due to vibration welding, the light-emitting efficiency, the insufficient area problem, and the interference of light rays among the light-emitting regions.

SUMMARY

An objective of the present invention is to provide a plurality of light-emitting elements located in two regions including a closed space and a non-closed space. The light-emitting efficiency of the light-emitting elements located in the closed space can be enhanced. The light rays emitted by the light-emitting elements located in the non-closed space will be reflected by the bevel of the optical element for solving the insufficient light on the periphery of the vehicle lamp.

The present invention provides a vehicle lamp structure, which comprises a base, a circuit board, at least one first light-emitting element, a plurality of second light-emitting elements, a ring block, a first optical element, a second optical element, and an optical cover. The circuit board is disposed above the base. According to an embodiment of the present invention, multiple first light-emitting elements are adopted. The first light-emitting elements and the second light-emitting elements are disposed on a top surface of the circuit board. The ring block is disposed above the circuit board. The first optical element and the second optical element are respectively disposed above the first light-emitting elements and the second light-emitting elements. The optical cover hoods the first optical element and the second light-emitting elements. The ring block surrounds the first light-emitting elements, and the first optical element and the optical cover are spaced by a distance.

According to an embodiment of the present invention, the base includes a protruding part thereon. The inner side of the protruding part is provided with at least one first connecting part. The outer side of the second optical element is provided with at least one second connecting part. Besides, the first connecting part is fixed to the second connecting part.

According to an embodiment of the present invention, the ring block includes at least one limiter substantially surrounding the top inner edge. The first optical element is disposed at the limiter.

According to an embodiment of the present invention, the second optical element includes at least one bevel substantially surrounding the top inner edge. A portion of a plurality of second light rays emitted by the second light-emitting elements is reflected by the bevel of the second optical element and emerges from the periphery of the optical cover.

DETAILED DESCRIPTION

In order to make the structure and characteristics as well as the effectiveness of the present invention to be further understood and recognized, the detailed description of the present invention is provided as follows along with embodiments and accompanying figures.

In the following description, various embodiments of the present invention are described using figures for describing the present invention in detail. Nonetheless, the concepts of the present invention can be embodied by various forms. Those embodiments are not used to limit the scope and range of the present invention.

Figure 1:
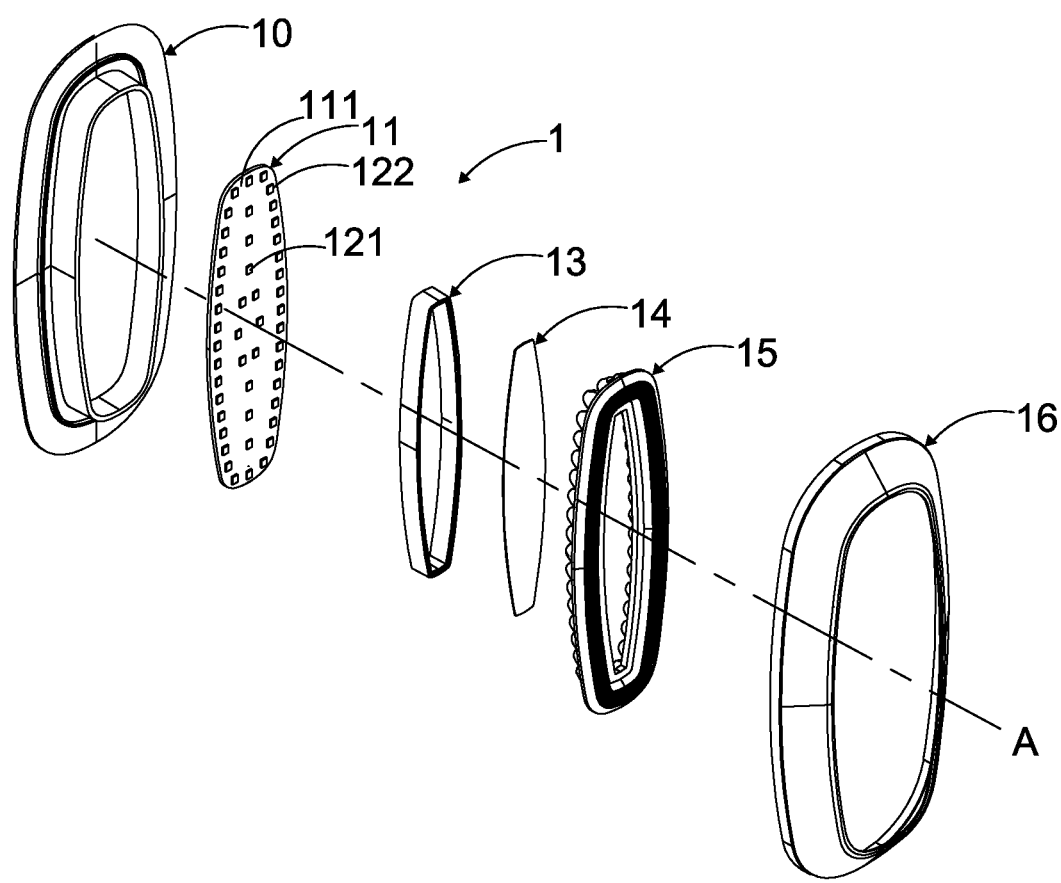
FIG. 1 shows a stereoscopic exploded view according to the first embodiment of the present invention.
Figure 2:
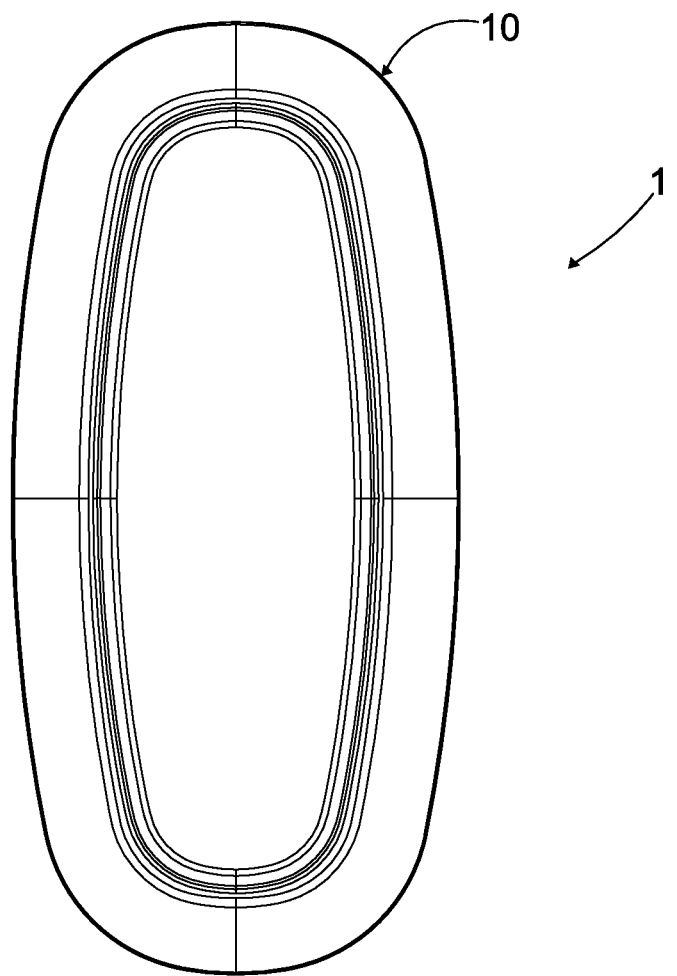
FIG. 2 shows an assembly view according to the first embodiment of the present invention.

First, please refer to FIG. 1 and FIG. 2, which show a stereoscopic exploded view and an assembly view according to the first embodiment of the present invention. According to the present embodiment, the vehicle lamp structure 1 comprises a base 10, a circuit board 11, at least one first light-emitting element 121, a plurality of second light-emitting elements 122, a ring block 13, a first optical element 14, a second optical element 15, and an optical cover 16. According to the present embodiment, multiple first light-emitting elements 121 are adopted. Alternatively, according to another embodiment, a single first light-emitting element 121 can be adopted. The first light-emitting elements 121 and the second light-emitting elements 122 are disposed on a top surface 111 of the circuit board 11. The ring block 13 surrounds the first light-emitting elements 121. According to the present embodiment, the ring block 13 surrounds the first light-emitting elements 121 continuously. Alternatively, according to another embodiment, the ring block 13 surrounds the first light-emitting elements 121 discontinuously. The second optical element 15 closely and substantially surrounds the periphery of the first optical element 14.

According to the present embodiment, the vehicle lamp structure 1 includes a central axis A. Alternatively, according to another embodiment, the vehicle lamp structure 1 is, but not limited to, an asymmetric structure. According to the present embodiment, the first light-emitting elements 121 and the second light-emitting elements 122 are LEDs. Alternatively, according to another embodiment, the first light-emitting elements 121 and the second light-emitting elements 122 are, but not limited to, organic light-emitting diodes (OLEDs), laser diodes (LDs), cold-cathode fluorescent lamps (CCFLs), and bulbs. According to the present embodiment, the first light-emitting elements 121 and the second light-emitting elements 122 are disposed on the same circuit board 11. Thereby, the problems of complicated processes and prohibitive costs owing to disposal on different circuit boards can be solved. Alternatively, according to another embodiment, the first light-emitting elements 121 and the second light-emitting elements 122 can be disposed on different circuit boards (not shown in the figures).

Figure 3:
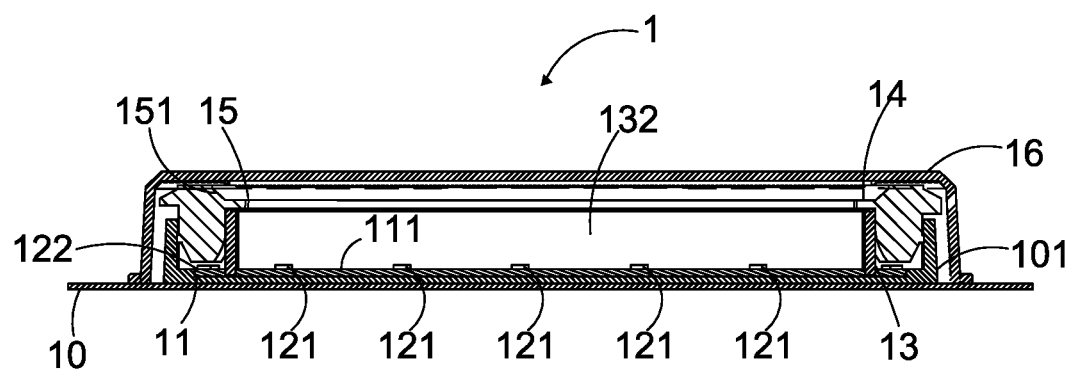
FIG. 3 shows a cross-sectional view according to the first embodiment of the present invention.
Figure 4:
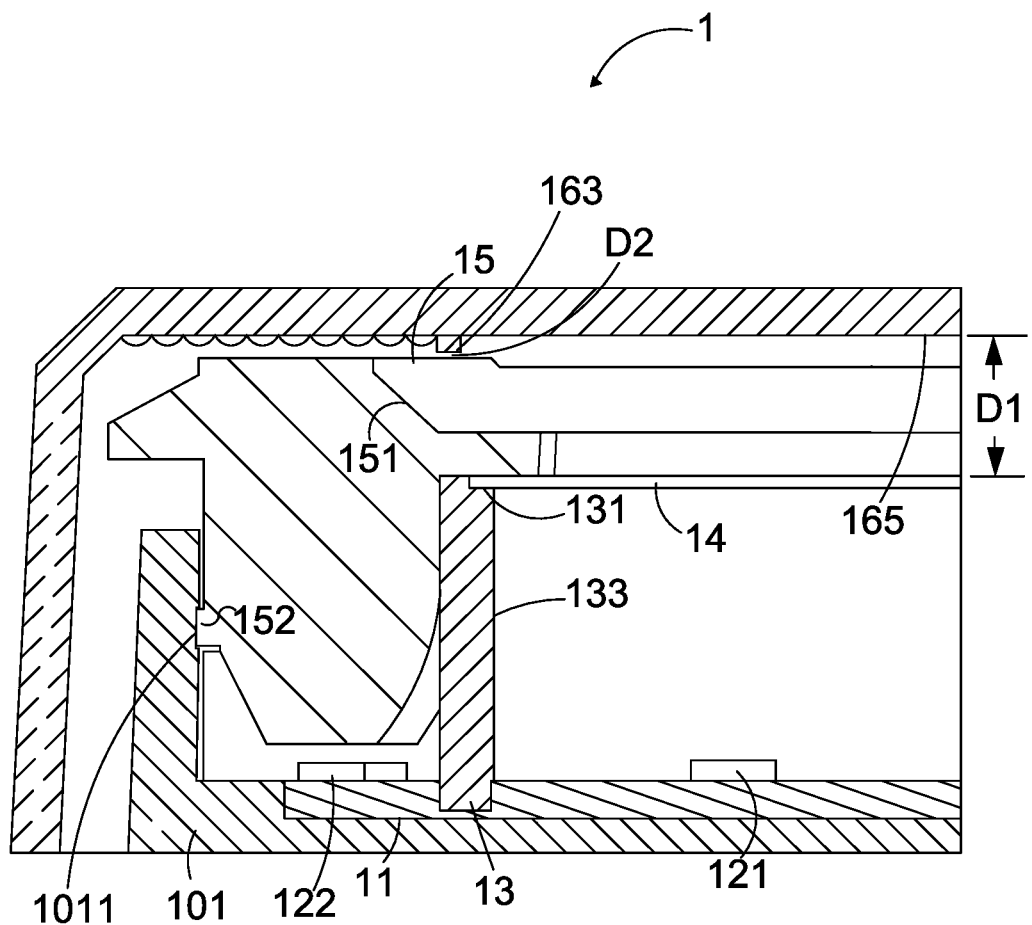
FIG. 4 shows a partially enlarged cross-sectional view according to the first embodiment of the present invention.

Please refer to FIG. 3 and FIG. 4. FIG. 3 shows a cross-sectional view according to the first embodiment of the present invention. FIG. 4 shows a partially enlarged cross-sectional view according to the first embodiment of the present invention. The base 10 includes a protruding part 101 thereon. Preferably, the protruding part 101 is, but not limited to, a housing. The circuit board 11 is disposed above the base 10. The ring block 13 is disposed above the circuit board 11. According to the present embodiment, the ring block 13 is disposed on the top surface 111 of the circuit board 11 and between the first light-emitting elements 121 and the second light-emitting elements 122. According to the present embodiment, the ring block 13 includes at least one limiter 131 substantially surrounding the top inner edge. The first optical element 14 is disposed at the limiter 131. The first optical element 14 and the second optical element 15 are respectively disposed above the first light-emitting elements 121 and the second light-emitting elements 122. The circuit board 11, the ring block 13, and the first optical element 14 form a substantial closed space 132. According to the present embodiment, an inner sidewall 133 of the ring block 13 is a reflective surface for enhancing the light-emitting efficiency of the substantial closed space 132. The ring block 13 isolates the light-emitting regions of the first light-emitting elements 121 and the second light-emitting elements 122 for avoiding or reducing the interference of the light rays among the two light-emitting regions.

The optical cover 16 hoods the first optical element 14 and the second optical element 15 and is fixed on the base 10. The optical cover 16 and the first optical element 14 are spaced by a distance D1. The inner side of the protruding part 101 is provided with at least one first connecting part 1011. The outer side of the second optical element 15 is provided with at least one second connecting part 152. The first connecting part 1011 is fixed to the second connecting part 152. According to the present embodiment, the first connecting part 1011 is a locking recess while the second connecting part 152 is a locking bump. Nonetheless, the present invention is not limited to the embodiment. In addition, according to the present embodiment, the number of the first connecting part 1011 and the second connecting part 152 is, but not limited to, four for mutual fixation. The fixing method according to the present invention can include, but not limited to, wedging, screwing, riveting, gluing, magnetic connecting, thermal pressing, and in-mold injection molding. The substantially surrounding (/substantially surrounds) according to the present invention refers, but not limited, to continuous or discontinuous surrounding.

The optical cover 16 includes at least one protruding structure 163. The protruding structure 163 substantially surrounds the outside of an inner surface 165 of the optical cover 16 opposing to the second optical element 15. According to the prior art, the protruding structure 163 can be used to partition different structures on the inner surface 165 and to partition different light-emitting effects (for example, partitioning the light emission of the first optical element 14 and the second optical element 15). In addition, the protruding structure 163 acts as a decoration, as well as pressing and fixing the second optical element 15. Unfortunately, according to the prior art, when the optical cover 16 is jointed with the base 10 by vibration welding, the friction will occur between the protruding structure 163 and the second optical element 15 to produce fragments into the vehicle lamp structure 1. Then the product quality and light-emitting efficiency will be affected. Accordingly, according to the present embodiment, the protruding structure 163 of the optical cover 16 and the second optical element 15 are spaced by a gap D2 for preventing friction and thus fragments between the protruding structure 163 of the optical cover 16 and the second optical element 15 owing to vibration welding. Thereby, the product quality and light-emitting efficiency will be improved. Besides, since the second optical element 15 can be fixed on the base 10 by fixing the first connecting part 1011 with the second connecting part 152, it is not required for the protruding structure 163 to press the second optical element 15.

Figure 5:
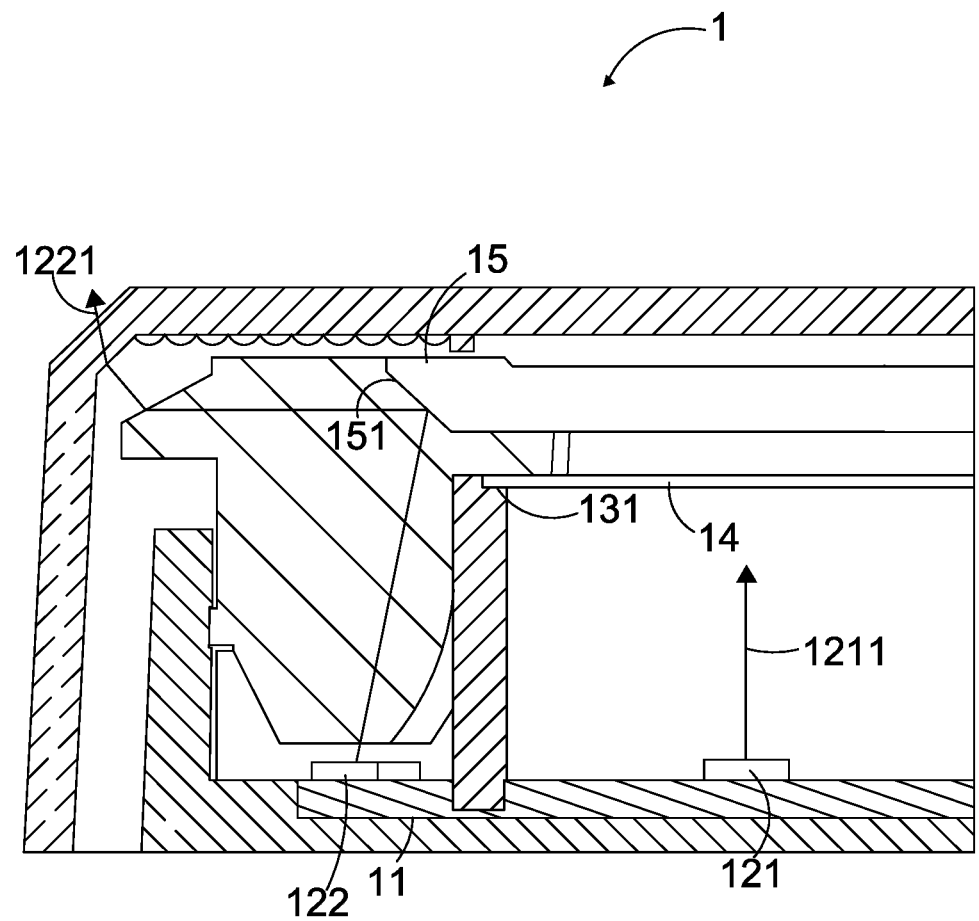
FIG. 5 shows a schematic diagram of the light path according to the first embodiment of the present invention.

Please refer to FIG. 5, which shows a schematic diagram of the light path according to the first embodiment of the present invention. The first light-emitting elements 121 emit a plurality of first light rays 1211, which are incident to the first optical element 14 and emergent from the optical cover 16. Thanks to the confining effect of the substantial closed space 132, the light-emitting efficiency of the first light rays 1211 via the first optical element 14 and the optical cover 16 is superior. The second optical element 15 includes at least one bevel 151 substantially surrounding the top inner edge. A portion of a plurality of second light rays 1221 emitted by the second light-emitting elements 122 is reflected by the bevel 151 of the second optical element 15 and emerges from the periphery of the optical cover 16. Thereby, the peripheral light-emitting region of the vehicle lamp structure 1 can be increased for avoiding incompliance with the regulation for vehicle lamps due to insufficient peripheral lighting. The bevel 151 enables partial reflection and partial refraction of the plurality of second light rays 1221 (not shown in the figure) and giving a ratio of partial reflection to partial refraction. The ratio is mainly determined according to the material and arrangement angle of the second optical element 15.

The vehicle lamp structure 1 according to the embodiment of the present invention comprises the ring block 13 for avoiding interference between the first light rays 1211 of the first light-emitting elements 121 and the second light rays 1221 of the second light-emitting elements 122. Thereby, a clearer emergent light shape can be formed. In addition, the ring block 13, the first optical element 14, and the circuit board 11 form the substantial closed space 132 so that the light-emitting efficiency of the first light rays 1211 can be enhanced by means of the closed-space effect. Besides, the bevel 151 of the second optical element 15 enables reflection of the second light rays 1221 and thus increasing the peripheral light-emitting region of the vehicle lamp structure 1. Furthermore, the protruding structure 163 of the optical cover 16 does not contact the second optical element 15 (spaced by the gap D2). When vibration welding is performed, no friction and hence no fragment will occur between the protruding structure 163 and the second optical element 15. Consequently, the product quality can be improved and the light-emitting efficiency will not be affected.

Figure 6:
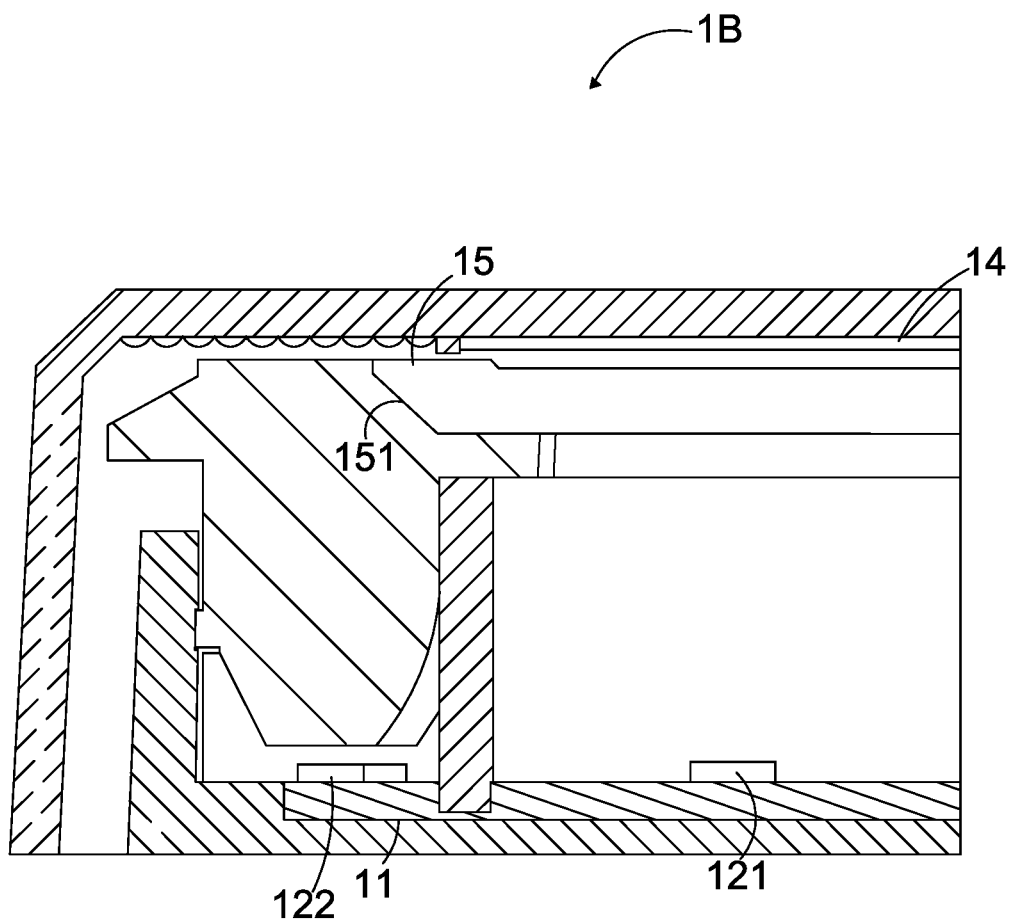
FIG. 6 shows a partially enlarged cross-sectional view according to the second embodiment of the present invention.

Please refer to FIG. 6, which shows a partially enlarged cross-sectional view according to the second embodiment of the present invention. The identical or similar places between the vehicle lamp structure 1B according to the present embodiment and the vehicle lamp structure 1 according to the previous embodiment will not be described again. Only the major difference will be described here. A first optical element 14 of the vehicle lamp structure 1B according to the present embodiment is fixed on an inner surface 165 of an optical cover 16. The fixing method can include, but not limited to, wedging, gluing, thermal pressing, and in-mold injection molding.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A vehicle lamp structure, comprising:
   a base;
   a circuit board, disposed above said base;
   at least one first light-emitting element, disposed on a top surface of said circuit board;
   a plurality of second light-emitting elements, disposed on said top surface of said circuit board;
   a ring block, disposed above said circuit board;
   a first optical element, disposed above said first light-emitting element;
   an optical cover, hooding said first optical element; and
   a second optical element, disposed above said plurality of second light-emitting elements;
   wherein said ring block surrounds said first light-emitting element; and said first optical element and said optical cover are spaced by a distance, said ring block is disposed on said top surface of said circuit board and between said first light-emitting element and said plurality of second light-emitting elements.

2. The vehicle lamp structure of claim 1, wherein said first optical element, said ring block, and said circuit board form a substantial closed space.

3. The vehicle lamp structure of claim 2, wherein said ring block includes at least one limiter substantially surrounding the top inner edge; and said first optical element is disposed at said limiter.

4. The vehicle lamp structure of claim 1, wherein said base includes a protruding part thereon; the inner side of said protruding part is provided with at least one first connecting part; the outer side of said second optical element is provided with at least one second connecting part; and said first connecting part is fixed to said second connecting part.

5. The vehicle lamp structure of claim 4, wherein said first connecting part is a locking recess; and said second connecting part is a locking bump.

6. The vehicle lamp structure of claim 1, wherein said second optical element closely and substantially surrounds the periphery of said first optical element.

7. The vehicle lamp structure of claim 1, wherein said second optical element includes at least one bevel substantially surrounding the top inner edge; a portion of a plurality of the light rays emitted by said plurality of second light-emitting elements is reflected by said bevel of said second optical element and emerges from the periphery of said optical cover.

8. The vehicle lamp structure of claim 1, wherein said optical cover includes at least one protruding structure substantially surrounding the outside of an inner surface of said optical cover opposing to said second optical element; and said protruding structure and said second optical element are spaced by a gap.

9. The vehicle lamp structure of claim 1, wherein an inner sidewall of said ring block is a reflective surface.

10. The vehicle lamp structure of claim 1, wherein said optical cover is fixed on said base.

11. A vehicle lamp structure, comprising:
    a base;
    a circuit board, disposed above said base;
    at least one first light-emitting element, disposed on a top surface of said circuit board;
    a plurality of second light-emitting elements, disposed on said top surface of said circuit board;
    a ring block, disposed above said circuit board;
    a first optical element, disposed above said first light-emitting element;
    a second optical element, disposed above said plurality of second light-emitting element; and
    an optical cover, hooding said first optical element and said second optical element;
    wherein said second optical element includes at least one bevel substantially surrounding the top inner edge; a portion of the light rays emitted by said plurality of second light-emitting elements is reflected by said bevel of said second optical element and emerges from the periphery of said optical cover.

12. The vehicle lamp structure of claim 11, wherein said first optical element is fixed on an inner surface of said optical cover; and said second optical element closely and substantially surrounds the periphery of said first optical element.

13. The vehicle lamp structure of claim 11, wherein said ring block is disposed on said top surface of said circuit board and between said first light-emitting element and said plurality of second light-emitting elements.

14. A vehicle lamp structure, comprising:
    a base;
    a circuit board, disposed above said base;
    at least one first light-emitting element, disposed on a top surface of said circuit board;
    a plurality of second light-emitting elements, disposed on said top surface of said circuit board;
    a ring block, disposed above said circuit board;
    a first optical element, disposed above said first light-emitting element;
    a second optical element, disposed above said plurality of second light-emitting element; and
    an optical cover, hooding said first optical element and said second optical element;
    wherein said base includes a protruding part thereon; the inner side of said protruding part is provided with at least one first connecting part; the outer side of said second optical element is provided with at least one second connecting part; and said first connecting part is fixed to said second connecting part.

15. The vehicle lamp structure of claim 14, wherein said first connecting part is a locking recess; and said second connecting part is a locking bump.

16. The vehicle lamp structure of claim 14, wherein said first optical element is fixed on an inner surface of said optical cover; and said second optical element closely and substantially surrounds the periphery of said first optical element.

17. The vehicle lamp structure of claim 14, wherein said ring block is disposed on said top surface of said circuit board and between said first light-emitting element and said plurality of second light-emitting elements.

18. The vehicle lamp structure of claim 14, wherein said optical cover is fixed on said base.

\* \* \* \* \*